(12) United States Patent
Maceri (10) Patent No.: US 6,935,621 B2
(45) Date of Patent: Aug. 30, 2005

(54) CONTROLLABLE MOVING FENCE FOR LIVESTOCK

(75) Inventor: Francisco J. Maceri, Buenos Aires (AR)

(73) Assignee: Interforming S.A., Buenos Aires (AR)

( * ) Notice: Subject to any disclaimer, the term of this patent is extended or adjusted under 35 U.S.C. 154(b) by 30 days.

(21) Appl. No.: 10/763,501

(22) Filed: Jan. 22, 2004

(65) Prior Publication Data

US 2004/0206944 A1 Oct. 21, 2004

(30) Foreign Application Priority Data

Apr. 15, 2003 (AR) ........................................ P030101322

(51) Int. Cl.[7] .................................................. A01K 3/00
(52) U.S. Cl. ........................................................ 256/10
(58) Field of Search ................................ 256/10, 1, 32, 256/33, 34, 37; 119/51.01, 51.11

(56) References Cited

U.S. PATENT DOCUMENTS 3,482,820 A * 12/1969 Angello ........................ 256/64
4,078,771 A * 3/1978 Diggs ........................... 256/10
4,407,485 A * 10/1983 Standing ........................ 256/10
5,355,834 A * 10/1994 Blazek ..................... 256/10 X

FOREIGN PATENT DOCUMENTS

WO        WO 01/08469 A1    2/2001

* cited by examiner

Primary Examiner—John R. Cottingham
(74) Attorney, Agent, or Firm—Darby & Darby (57) ABSTRACT

A programmable and controllable moving fence system for handling livestock capable of controlling the movement of a livestock on a feeding pasture lot for controlling and optimizing the pasture consuming during the feeding of the livestock, wherein the system comprises a boundary fence encircling the lot and a moving fence crossing the lot and separating the lot into two lot portions, one portion containing the livestock and the other portion containing the pasture, with the lot portion having the pasture being controllably exposed to the livestock for feeding.

16 Claims, 6 Drawing Sheets

CONTROLLABLE MOVING FENCE FOR LIVESTOCK

BACKGROUND OF THE INVENTION

1. Field of the Invention

The present invention relates to the field of farm activities such as works in stud farms, stock farms, animal breeding farms and the like, and more particularly the invention refers to a controllable moving fence system for defining the boundaries of a lot for containing livestock, cattle, etc. and for controllably handling and/or feeding the livestock.

While specific reference will be made in this specification to the application of the inventive system for breeding cattle, this system may be well applied to other fields where one or more animals should be managed or, most preferably, where the animals should move over a lot, preferably a pasture lot, in a desirable manner.

2. Description of the Prior Art

A new moving fence for handling livestock, preferably cattle, has already been disclosed in Argentine Patent Application Serial No. P01010037 to the same inventor and applicant of the present application, filed on Jan., 2001 and published on Sep. 24, 2003. This prior application relates to a fence system including a boundary fence encircling a pasture lot for feeding cattle and a moving fence extending across the lot to divide the lot in at least two lot portions, one for containing the animals and the opposite one for preserving the grass by preventing the animals from uncontrollably entering into the pasture portion. For this purpose the moving fence moves under control in order to allow the animals entering the pasture lot only along a pasture strip that exposes new grass for the cattle only at a zone were each animal has its head to eat the grass, thus preventing the animal to step on the grass and cause damages to the grass. Once a grass strip has been consumed and according to a manual control or programmed parameters, the moving fence moves to live a new strip of land exposed to the animals just only for eating purposes and with an extension enough to allow the cattle to eat without stepping onto the strip. Thus, each animal has always new and fresh grass only exposed along a strip with a width enough for eating.

As it is clearly explained in the inventor's prior patent application, the conventional feeding of the cattle involves many drawbacks. In a conventional farm having cattle some lots are prepared and closed in order to allow the growing of pasture, such as grass, hay and the like, namely food for the cattle, and in order to preserve the well growing of the pasture for feeding the animals. When the pasture has grown properly the animals are permitted to enter the lot for eating. However, when the animals enter the lot they step and uncontrollably walk and move onto the new and fresh grass thus causing important damages thereto. In addition, the urination and defecation of the animals cause important damages in the pasture and an important portion of the pasture are not consumed because of these damages.

As a result of the above uncontrolled moving and handling of the cattle, a large amount of pasture results unproductive for feeding purposes thus causing important looses in the farm profits. The pasture looses are estimated in a 33% which is a high component in the costs involved in the farm. In relation to the daily feeding for several cattle varieties, studies and calculations have been made to determine which is the adequate pasture land or surface for the correct feeding of a number of animals such as a rodeo. According to the inventor's prior application, in the width/length ratio of the lots the surface or area of the pasture strips may be calculated in order that the enough amount of food is available to the animals. The land strips also may be determined for obtaining the optimum utilization and profitability of the pasture.

While the above moving fence system for handling cattle has shown to work efficiently and it is profitable, the inventor has found that the system can be improved in order to get more effective use thereof and to have customized versions of same according to the several needs of different farms. Under these circumstances the inventor has developed a new moving fence system.

SUMMARY OF THE INVENTION

It is therefore one object of the present invention to provide a programmable and controllable automatically moving fence system for handling livestock, capable of controlling the movement of a livestock on a feeding pasture lot for controlling and optimizing the consuming of pasture during the feeding of the livestock, wherein the system comprises a boundary fence encircling the lot and a moving fence crossing the lot and separating the lot into two lot portions, one portion containing the livestock and the other portion containing the pasture, with the lot portion having the pasture being controllably exposed to the livestock for feeding.

It is still another object of the present invention to provide a moving fence system for handling livestock, such as cattle, comprising a boundary fence encircling a pasture lot and a moving fence dividing the lot into two portions, wherein a first portion is for containing the animals and for providing the animals with access to pasture strips with the strips having controlled dimensions for allowing the animals to eat the grass without stepping on the same and with the animals being arranged in a manner that the defecation thereof falls down onto the land where the pasture has already been eaten by the animals and not over the fresh grass. Therefore the animals are allowed to walk in a direction towards the portion of the lot with fresh grass but only with access to new strips of grass without uncontrollably entering the entire pasture lot.

It is even another object of the present invention to provide a new fence system for handling cattle, the system comprising a boundary fence encircling a pasture lot and at least one moving cross wire fence for limiting the width of pasture strips that are made accessible to the animals sequentially, the cross wire moving along side wires in the lot, with all the wires preferably electrified.

It is still another object of the present invention to provide a controllable moving fence system for handling livestock and for controlling the consuming of pasture during the feeding of livestock, the system comprising a boundary fence defining a lot, such as an electric fence wire, and at least one controllable moving fence, for example an electric fence wire, extending between opposite sides of the boundary fence, the moving fence dividing and separating the lot into at least one first lot portion at one side of the moving fence, for containing the livestock, and at least one second lot portion at another opposite side of the moving fence, for conserving the pasture, whereby the moving fence controllably moves, for example under the action of driving means, to increase the area of the first lot portion and to decrease the area of the second lot portion, wherein the at least one moving fence may have two opposite ends with each end connected to one corresponding side of the opposite sides of the boundary fence and capable of moving along the corresponding opposite side of the boundary fence.

It is still another object of the present invention to provide a controllable moving fence system as any one of the above disclosed inventive systems, wherein each end of the moving fence may be connected to a moving carrier that moves along one of the corresponding opposite sides of the boundary fence, the carrier being connected to the driving means for moving the carrier along at least one side wire in each of the opposite sides of the boundary fence, with the moving carrier comprising a support base made of electrical insulating material and the carrier includes driving wheels and guiding-contacting wheels for moving and guiding along said at least one side wire in the opposite sides of the boundary fence, the guiding-contacting wheels being resiliently mounted in the carrier for resiliently contacting the side wires and wherein the driving means comprises motor means and the at least one side wire comprises a pair of electrical feeding wires at each of said opposite sides of the boundary fence, for electrically feeding the motor means in the carrier.

It is still another object of the present invention to provide a controllable moving fence system as any one of the above disclosed inventive systems, further comprising a third electrical wire for electrifying the moving fence, wherein said motor means is connected to the electrical feeding wires through the guiding-contacting wheels in the carrier with the guiding-contacting wheels being in electrical contact with each of the electrical feeding wires and with the third wire being connected to the moving fence through a fence contacting wheel that is in electrical contact with the third wire and the moving fence, wherein the electrical feeding wires are connected to an electronic control and electrification unit and the motor means comprises two motors, for example DC low tension motors, in each carrier with a driving wheel mounted in each motor and the driving wheel being made of insulating material, and wherein the motors include respective speed varying boxes connected to the driving wheels.

It is still another object of the present invention to provide a controllable moving fence system as any one of the above disclosed inventive systems, wherein the carrier includes four guiding-contacting wheels with each motor being in feeding contact to two associated ones of the four guiding-contacting wheels, and the driving wheels and the guiding-contacting wheels are arranged in a zig-zag pattern and each electrical feeding wire is associated to one motor and passes between a pair of the guiding-contacting wheels associated to the one motor and a the driving wheel of the one motor, with each guiding-contacting wheel including a shaft made of electrical conducting material and connected to a feeding input of an associated one of the motors through a spring, the spring providing a resilient mounting for the guiding-contacting wheel.

It is still another object of the present invention to provide a controllable moving fence system as any one of the above disclosed inventive systems, wherein the carrier includes a conducting bar having at least one end thereof connected in electrical conducting relationship to the moving fence, the bar being in turn electrically connected to an electrical conducting secondary bar having an end including the fence contacting wheel, the secondary bar and the fence contacting wheel being in electrical conducting contact, and wherein the moving fence is connected to the secondary conducting bar through a conducting hook.

It is still another object of the present invention to provide a controllable moving fence system as any one of the above disclosed inventive systems, wherein the electronic control and electrification unit may include a second-minute-hour-day programmable timer for operating the carriers according to a programmed motion pattern and wherein the electronic control and electrification unit may include a computer with a program stored therein, the program processing clock data, operation periods data, number of animals, sizes of animals and pasture density.

BRIEF DESCRIPTION OF THE DRAWINGS

The present invention is illustrated by way of example in the following drawings wherein.

DESCRIPTION OF THE PREFERRED EMBODIMENTS

Figure 1:
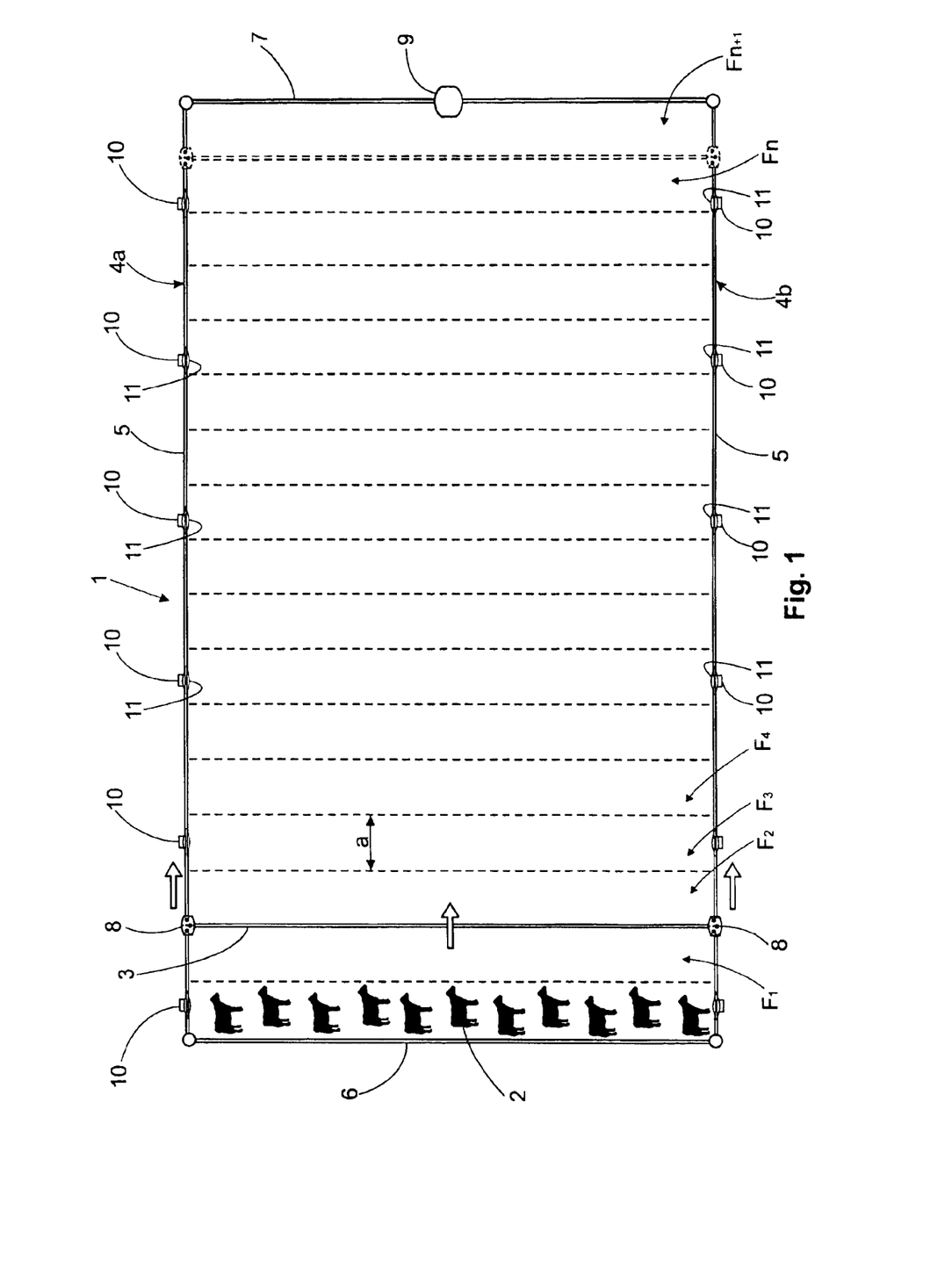
FIG. 1 shows a top plan diagrammatical view of a pasture lot with the moving fence system according to a preferred embodiment of the invention.

Now referring in detail to the drawings it may be seen from FIG. 1 a pasture lot, namely a lot with grass, hay, and the like for feeding cattle. The lot, indicated by general reference number 1, is a piece of land employed for handling and feeding cattle comprising animals indicated by reference number 2. The lot is closed by a boundary fence consisting of sides 4a and 4b and ends 6 and 7, preferably fences consisting of wires, and most preferably of electrical wires.

At least one controllable moving fence 3 extends between opposite sides 4a and 4b of the boundary fence in manner that the moving fence divides and separates the lot into at least one first lot portion at one side, the left side, of the moving fence, for containing the livestock 2, and at least one second lot portion at another opposite side of the moving fence, namely at the right side of fence 3, for conserving the pasture and controllably open the second lot portion to animals 2, whereby moving fence 3 controllably moves to increase the area of the first lot portion and to decrease the area of the second lot portion. Thus, wire 3 moves ahead in order to make strips F1 . . . Fn+1, having a width "a", accessible to the animals for feeding purposes.

Wire 3 is connected at their ends to corresponding or associated carriers generically indicated by reference number 8 at the opposite sides of the boundary fence. Carriers 8 move along sides 4a and 4b through side wires 5 and the carriers are connected to driving means, such as motor means 9 comprising electrical motors for example, that may be connected to winding means, such as a winch, a reel or spool (not shown), for pulling from wire 3, located at any location close to the boundary fence. The motors may be DC motors, AC motors, one-sense rotation motors or both-senses rotation motors, and the motors are connected to timer circuits in order to control the movement and times of the movement of wire 3. Thus the width "a" of each strip Fn and the time wire 3 remains in one location may be controlled whereby the animals will access the grass strips in a sequentially and controllable manner. Boundary fence wires 5 may be mounted in posts 10 and side wires 5 may include sliding supports 11 for permitting carriers 8 to run along wires 5.

Once the grass of strip Fn has been consumed by the animals, what can be easily calculated, driving means 9 moves moving wire 3 ahead in order to make a new strip, for example strip F2, accessible to the animals for feeding. The time sequence that wire 3 is moved ahead is calculated according to the kind, number and species of animals that are involved. The kind and number of animals, kind of grass, width of the lot, etc., are parameters that are considered in the calculation of the width "a" and the frequency of the wire motion. Once the animals have eaten a strip F1, for example, a new strip F2 is open and F1 may be closed by moving another moving wire (not shown) behind the animals, in order to restrict the animals to a desired strip or pair of strips without accessing to front strips that have been consumed, thus allowing new grass to grow.

Figure 2:
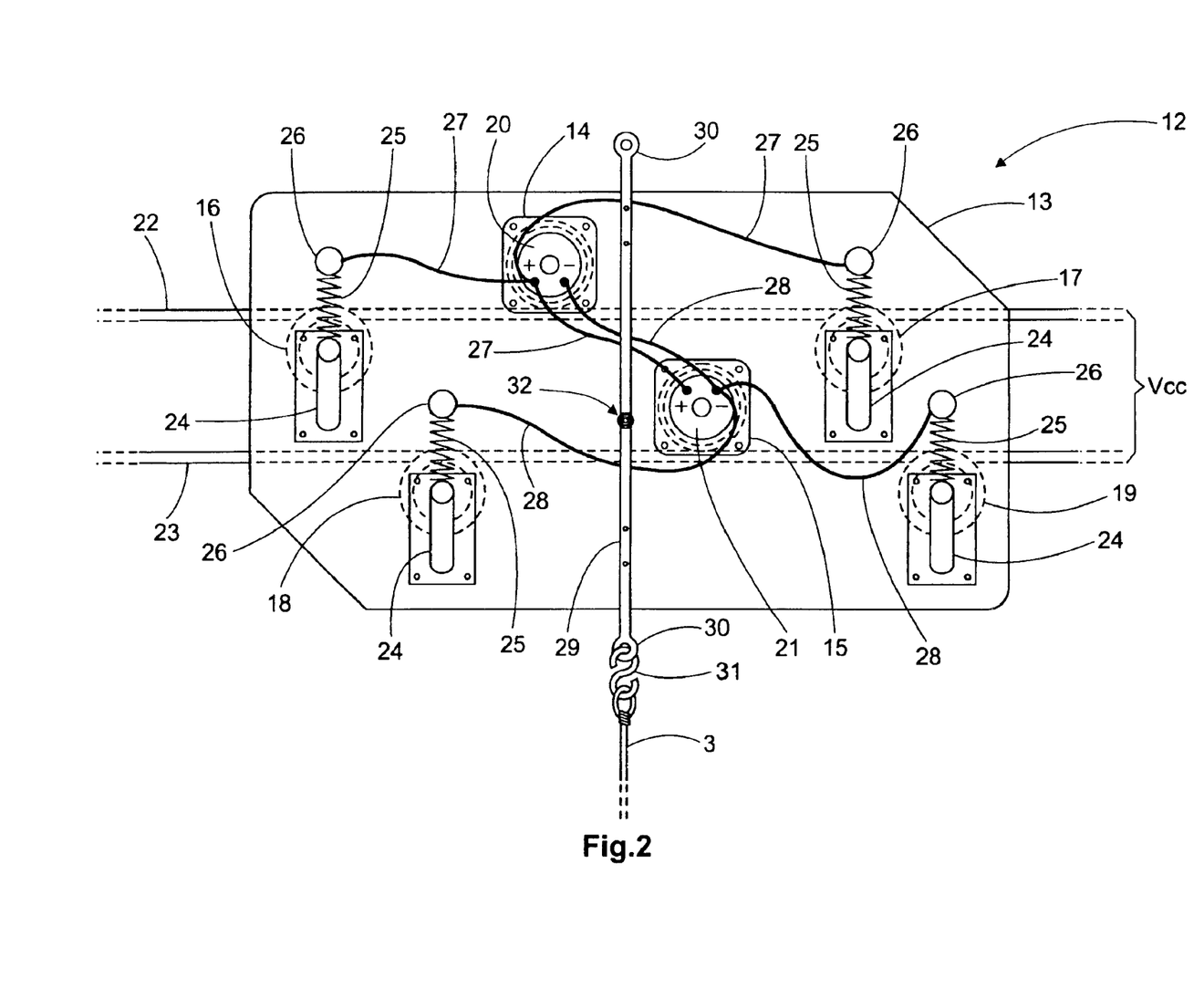
FIG. 2 shows a top plan view of a carrier of the system according to the invention.
Figure 3:
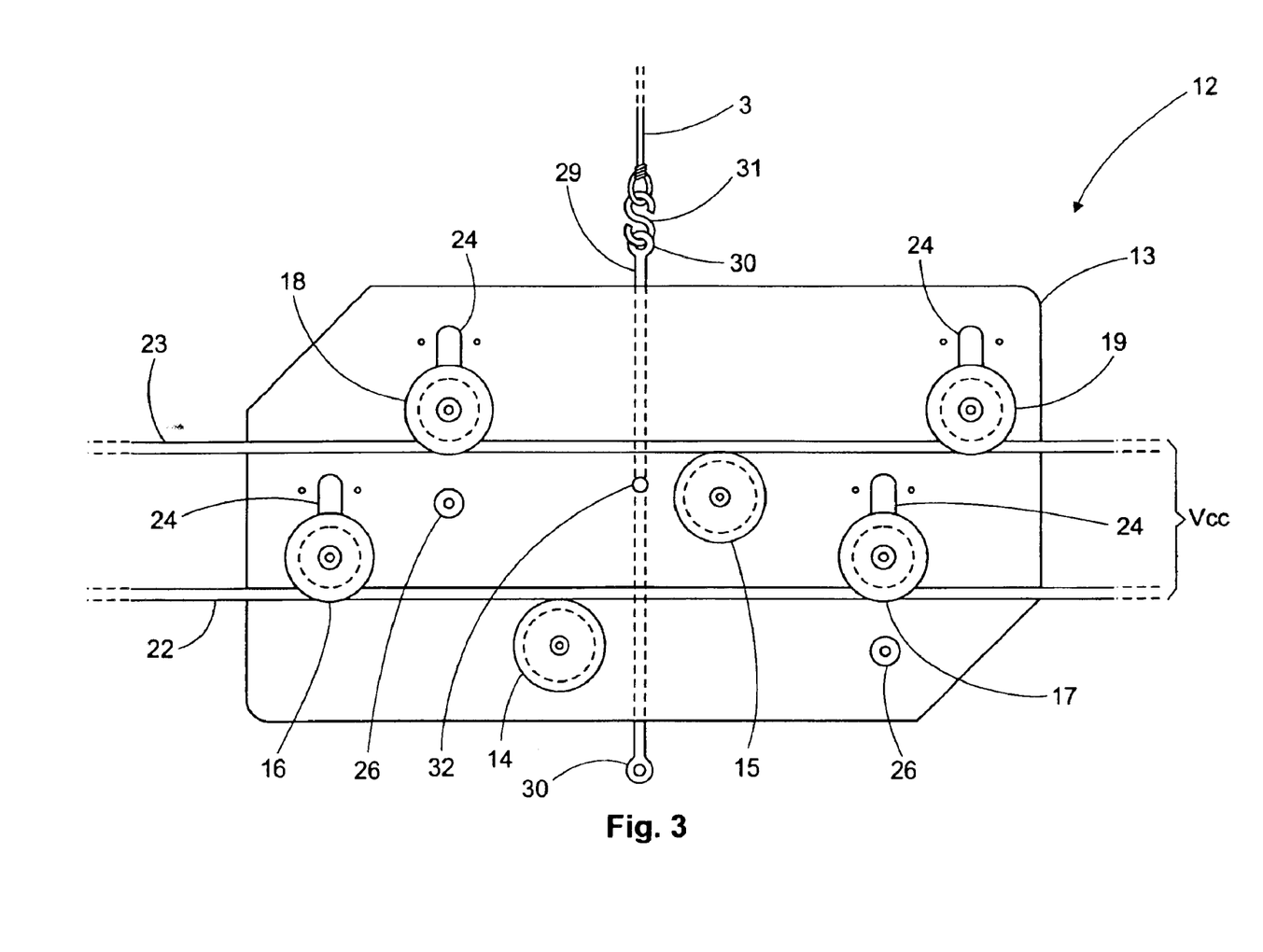
FIG. 3 shows a bottom plan view of the carrier of FIG. 2.

FIGS. 2 and 3 show the upper and bottom sides, respectively, of a carrier according to the invention. This carrier is indicated by general reference 12 but the same may be the same indicated by reference 8 in FIG. 1. Carrier 12 comprises a support base 13 wherein a pair of driving wheels 14, 15 and four guiding-contacting wheels 16, 17, 18, 19 are mounted. Wheels 16–19 are electrically conductive and operates to guide the carrier and provide the necessary electrical feeding for the driving of carrier 12. As it is explained below, two motors 20, 21 are fed either by batteries or by electrical lines, such as by electrical feeding wires 22, 23. Driving wheels 14, 15 are mounted in the motors to move the carriers along wires 22, 23 with the help of guiding-contacting wheels 16–19. Motors 20, 21 are preferably Dc low tension motors, most preferably 24 V. motors and the driving wheels are made of electrical insulating material. Each motor is in feeding contact to two associated ones 16, 17 and 18, 19 of the four guiding-contacting wheels. Preferably, the driving wheels and the guiding-contacting wheels are arranged in a zig-zag or triangular pattern and each electrical feeding wire is associated to one motor and passes between a pair of the guiding-contacting wheels associated to the one motor and a the driving wheel of the one motor.

A vertical electrical conductive shaft of each wheel 16–19 passes through a respective notch 24 and is connected to a spring 25 which in turn is connected to a metal conductive pin 26 which may operate to feed electricity, for example DC from wires 27, 28 that are connected to the positive and negative poles of the motors. Thus wheels 16–19, resiliently mounted in the associated carrier, operate to adjust and guide the motion along wires 22, 23 and to provide electrical feeding to motors 20, 21 through their wheel shafts, springs 25, pins 26 and wires 27, 28.

As it is shown in FIG. 2 base or plate 13 of carrier 12 includes a conductive bar 29 having respective opposite ends defining terminals 30 for physically and electrically connecting to moving wire 3, preferably by means of hooks 31. Conductive bar 29 is in turn electrically connected, FIG. 4, to an electrical conducting secondary bar 32 having an end, for example a bottom end, including a fence contacting wheel 33 that is electrically conductive. Wheel 33 is in electrical contact with a third electrical wire 34 for electrifying the moving fence wire. Wire 34 may be connected for example to a high tension pulse generator located in any location close to the lot. Thus the high tension pulses from wire 34, the amplitude and frequency of which are predetermined according to the type of animals, are conducted through wheel 33, secondary bar 32, bar 29 to wire 3.

Figure 4:
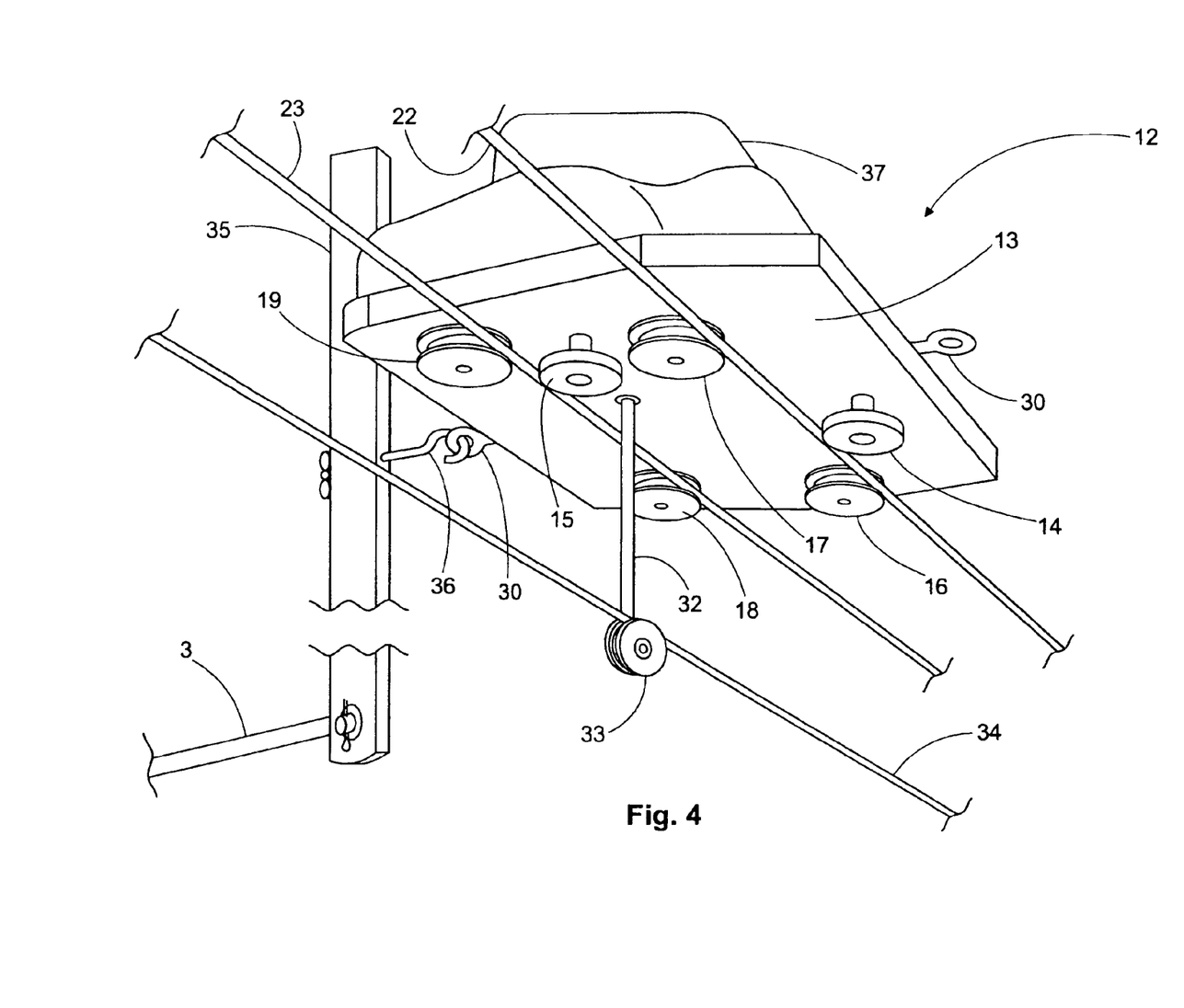
FIG. 4 shows a bottom perspective view of the carrier of FIGS. 2 and 3.

FIG. 4 particularly shows an alternative embodiment relating to a way wire 3 is connected to conductive bar 29. Wire 3 may be connected to a bottom end of a vertical bar 35 which in turn is connected to terminal 30 of bar 29 by means of hook 36 that may be made of conductive material. Furthermore, a protective cover 37 may be provided in carrier 12 to enclose all the electrical components and mechanisms. As it will be clear to any person skilled in the art, any other way to get the electrical and physical connection between the carrier and the moving fence wire is possible. For example, bar 35 may be used or not but when used it permits to locate wire 3 at any desired height over the soil.

Figure 5:
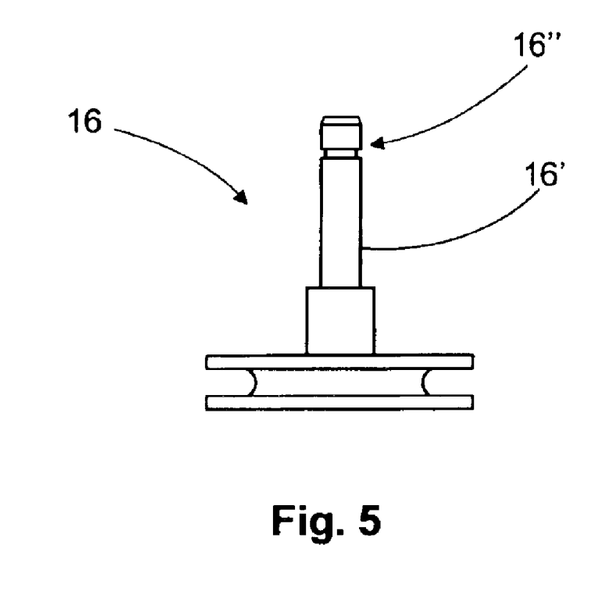
FIG. 5 shows a side elevational view of a guiding-contacting wheel according to the invention.
Figure 6:
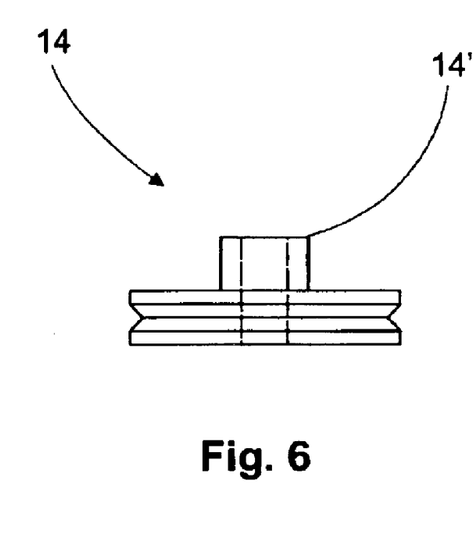
FIG. 6 shows a side elevational view of a driving wheel according to the invention.

FIG. 5 shows a guiding-contacting wheel 16 having a shaft 16' with an end 16" thereof connecting a corresponding end of tensile spring 25. These guiding-contacting wheels and their respective shafts are made of metal such as copper or bronze. FIG. 6 shows a driving wheel 14 that may be made, for example, of rubber, rubber-lined metal, plastic, preferably polyethylene also covered by rubber, and wheel 14 includes an axial metallic insert 14' for connecting to base 13 of carrier 12.

Figure 7:
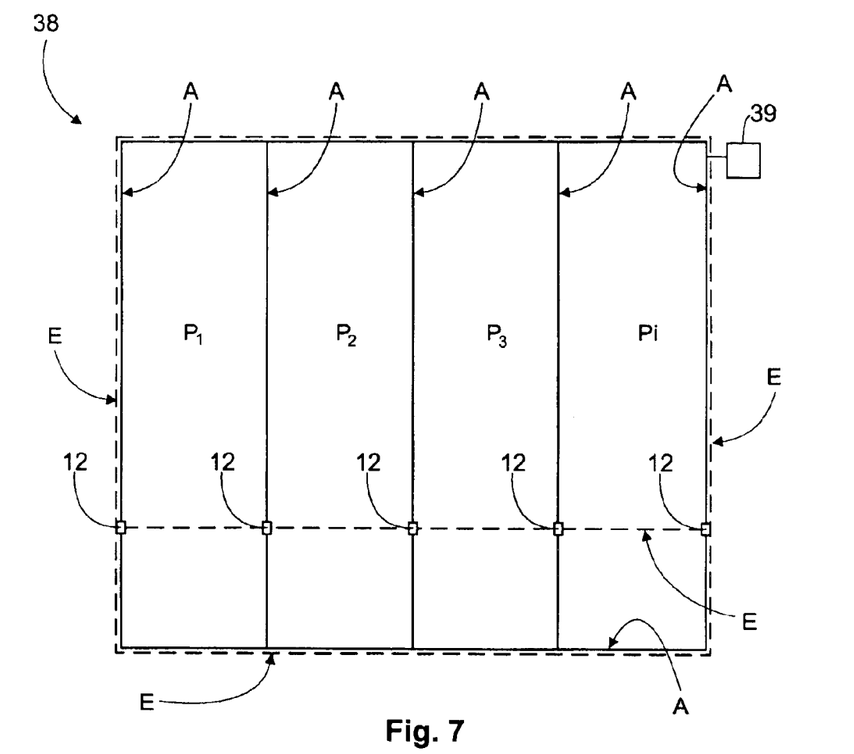
FIG. 7 shows a top plan diagrammatical view of another pasture lot with the moving fence system according to a preferred embodiment of the invention.
Figure 8:
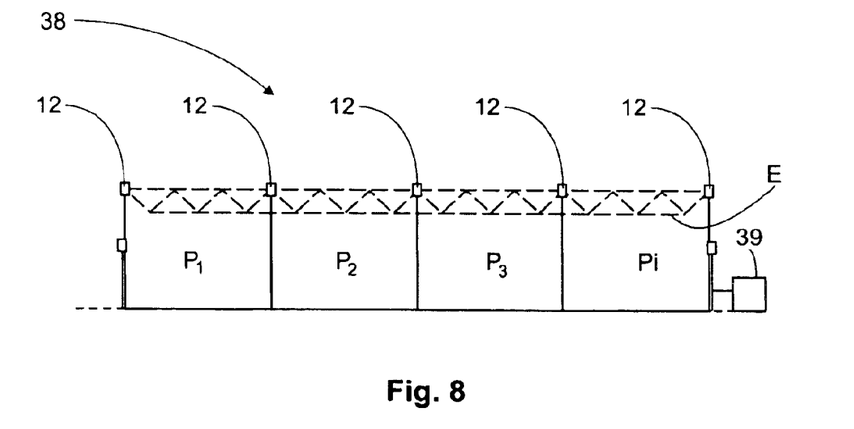
FIG. 8 shows a front elevational view of the pasture lot of FIG. 7.

FIGS. 7, 8 diagrammatically shows a pasture lot indicated by general reference 38 wherein wires 22, 23 for mounting carriers 12 are indicated by solid lines having the reference "A". Electrical wires 3 are identified by phantom lines E. The lot may be divided into portions P1, P2, P3, . . . Pi, having a length and width that will depend of several parameters such as the type of animals, number of animals, type of pasture, the season, etc. Depending on the location in the lot the carriers may be connected to the electrical wires, moving fences, at one or both of terminals 30 of bar 29.

Since each carrier 12 is mounted on a pair of wires, namely wires 22, 23, the movement of the carriers is very stable. In addition, since carrier 12 employs two tractor or driving motors, namely motors 20, 21, a more force is available to move the moving fence. The driving motors may include respective speed varying boxes (not shown) connected to the driving wheels. Also, when no batteries are located in the carriers and, instead, an electronic control and electrification unit indicated by reference 39 is provided a large autonomy is achieved and the carriers are lighter. In effect, said stationary unit 39 may include larger capacity batteries for feeding all the system, namely wires 22, 23, 34, 3.

Electronic control and electrification unit 39 may be properly located close to the lot and, while stationary during the operation, it may be removable in order to transfer the unit to other lots. Unit 39 may include timer means such as a programmable timer that can be programmed according to seconds, minutes, hours and days for operating the carriers according to a programmed motion pattern. The electronic control and electrification unit also may include a computer with a program stored therein, the program processing clock data, operation periods data, number of animals, sizes of animals and pasture density, for example.

In addition to the above examples of the invention, the system may include several alternatives. As disclosed above, the moving fence is connected at opposite ends thereof to respective carriers moving along the side wires and the carriers are connected to driving means. This driving means may permit to move the carriers manually or automatically by means of, for example, electrical motors. The driving wheels and guiding-contacting wheels provided in the carriers may be arranged in a triangular patterns or zig-zag pattern to be in electrical contact to the wires. The wheels are preferably mounted in a resilient manner along guiding notches in a base of the carrier under the action of springs that are connected to the wheels and respective fixed pins in said base. The carrier may be connected to one or more driving wires, such as pulling wires or may be provided with motors to drive the carrier along stationary side wires, with the motor being mounted either in a stationary place close to the lot or in the carriers. Depending of the moving wire length this wire may be suspended from a top wire by means of a plurality of pending wires to keep the moving fence wire parallel to the soil surface. Also depending of this wire length additional carriers may be arranged in middle portions of the moving fence wire to facilitate the driving of the moving fence. The driving means may be connected to any kind of timers to define the periods of time when the moving fence must be moved ahead and the motors may be connected to spools, reels or winches for winding the pulling wires for moving the moving fence. The number of driving and guiding-contacting wheels may be variable depending on the fence dimensions, the wheels may be made of any proper material such as rubber, lined metal, plastics for isolating wheels and metal, such as copper, bronze, etc. for conducting wheels.

While preferred embodiments of the present invention have been illustrated and described, it will be obvious to those skilled in the art that various changes and modifications may be made therein without departing from the scope of the invention as defined in the appended claims.

I claim:

1. A controllable fence system for handling livestock and for controlling the consuming of pasture during the feeding of livestock, comprising:

a boundary fence with opposite sides defining a lot, each of the opposite sides having at least one side wire; and at least one controllable moving fence, which comprises:

two opposite ends with each end connected to one corresponding side of the opposite sides of the boundary fence and capable of moving along the corresponding opposite side of the boundary fence; and a moving carrier comprising a support base of electrical insulating material connected to driving means connected to each end of the moving fence for moving the carrier along the at least one side wire of each of the opposite sides of the boundary fence, the carrier including driving wheels and guiding-contacting wheels for moving and guiding along the at least one side wire of the opposite sides of the boundary fence, the guiding-contacting wheels being resiliently mounted in the carrier for resiliently contacting the respective at least one side wire of the fence sides.

2. The system of claim 1, wherein at least the moving fence comprises an electric wire.

3. The system of claim 1, wherein the driving means comprises motor means and the at least one side wire comprises a pair of electrical feeding wires at each of said opposite sides of the boundary fence, for electrically feeding the motor means in the carrier, and a third electrical wire for electrifying the moving fence.

4. The system of claim 1, wherein said motor means is connected to the electrical feeding wires through the guiding-contacting wheels in the carrier with the guiding-contacting wheels being in electrical contact with each of the electrical feeding wires and with the third wire being connected to the moving fence through a fence contacting wheel that is in electrical contact with the third wire and the moving fence.

5. The system of claim 3, wherein the electrical feeding wires are connected to an electronic control and electrification unit.

6. The system of claim 3, wherein the motor means comprises two motors in each carrier with a driving wheel mounted in each motor, the driving wheel being made of insulating material.

7. The system of claim 6, wherein the carrier includes four guiding-contacting wheels with each motor being in feeding contact to two associated ones of the four guiding-contacting wheels.

8. The system of claim 7, wherein the driving wheels and the guiding-contacting wheels are arranged in a zig-zag pattern and each electrical feeding wire is associated to one motor and passes between a pair of the guiding-contacting wheels associated to the one motor and a the driving wheel of the one motor.

9. The system of claim 8, wherein the each guiding-contacting wheel includes a shaft made of electrical conducting material and connected to a feeding input of an associated one of the motors through a spring, the spring providing a resilient mounting for the guiding-contacting wheel.

10. The system of claim 9, wherein the carrier includes a conducting bar having at least one end thereof connected in electrical conducting relationship to the moving fence, the bar being in turn electrically connected to an electrical conducting secondary bar having an end including the fence contacting wheel, the secondary bar and the fence contacting wheel being in electrical conducting contact.

11. The system of claim 10, wherein the moving fence is connected to the secondary conducting bar through a conducting hook.

12. The system of claim 11, wherein the motors are DC low tension motors.

13. The system of claim 12, wherein the motors include respective speed varying boxes connected to the driving wheels.

14. The system of claim 13, wherein the electronic control and electrification unit includes a second-minute-hour-day programmable timer for operating the carriers according to a programmed motion pattern.

15. The system of claim 13, wherein the electronic control and electrification unit includes a computer with a program stored therein, the program processing clock data, operation periods data, number of animals, sizes of animals and pasture density.

16. The system of claim 1, wherein the at least one side wire of at least one fence side is an electrical wire to supply electrical current to the moving carrier.

* * * * *